(12) United States Patent
Furukawa et al.

(10) Patent No.: US 9,426,438 B2
(45) Date of Patent: Aug. 23, 2016

(54) IMAGE PROCESSING APPARATUS, IMAGE PROCESSING METHOD, AND ELECTRONIC APPARATUS TO DETECT AND CORRECT FALSE COLOR IN HIGH DYNAMIC RANGE IMAGING

(71) Applicant: Sony Corporation, Tokyo (JP)

(72) Inventors: Ryosuke Furukawa, Tokyo (JP); Kensei Jo, Kumamoto (JP)

(73) Assignee: SONY CORPORATION (JP)

( * ) Notice: Subject to any disclaimer, the term of this patent is extended or adjusted under 35 U.S.C. 154(b) by 92 days.

(21) Appl. No.: 14/448,663

(22) Filed: Jul. 31, 2014

(65) Prior Publication Data

US 2015/0042848 A1 Feb. 12, 2015

(30) Foreign Application Priority Data

Aug. 7, 2013 (JP) .................................. 2013-163782

(51) Int. Cl.
| | |
|---|---|
| *H04N 9/68* | (2006.01) |
| *G06T 3/40* | (2006.01) |
| *G06T 5/00* | (2006.01) |
| *H04N 5/235* | (2006.01) |

(52) U.S. Cl.
CPC ................ *H04N 9/68* (2013.01); *G06T 3/4015* (2013.01); *G06T 5/008* (2013.01); *H04N 5/2355* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 2007/0285526 A1* | 12/2007 | Mann et al. ................ | 348/222.1 |
| 2010/0053346 A1* | 3/2010 | Mitsunaga ................ | 348/208.6 |
| 2010/0321525 A1* | 12/2010 | Nagata ........................ | 348/230.1 |
| 2011/0063483 A1* | 3/2011 | Rossi et al. .................... | 348/294 |
| 2012/0281111 A1* | 11/2012 | Jo et al. ...................... | 348/229.1 |
| 2013/0051700 A1* | 2/2013 | Jo ................................. | 382/284 |
| 2013/0222625 A1* | 8/2013 | Tatsuzawa et al. ......... | 348/208.6 |
| 2014/0267828 A1* | 9/2014 | Kasai et al. ................. | 348/229.1 |

* cited by examiner

*Primary Examiner* — Shahbaz Nazrul
(74) *Attorney, Agent, or Firm* — Sheridan Ross P.C.

(57) ABSTRACT

According to an embodiment of the present disclosure, a part estimated to have a high degree of generation of false color for predetermined parts of an input image imaged by different exposure times at a predetermined spatial period is detected. A false color intensity value indicating an estimated degree of generation of false color is calculated for each of the predetermined parts. A high dynamic range image is generated by executing processing to merge long-time exposure pixels and short-time exposure pixels making up the input image. False color correction processing is executed according to the intensity of the false color intensity value, to the high dynamic range image. The present disclosure may be applied to, for example, an image processing unit within a solid state image sensor.

12 Claims, 8 Drawing Sheets

FIG.2A

|R|G|R|G|R|G|R|G|
|G|B|G|B|G|B|G|B|
|R|G|R|G|R|G|R|G|
|G|B|G|B|G|B|G|B|
|R|G|R|G|R|G|R|G|
|G|B|G|B|G|B|G|B|
|R|G|R|G|R|G|R|G|
|G|B|G|B|G|B|G|B|

☐ Long-time exposure pixels
▨ Short-time exposure pixels

FIG.2B

|R|G|R|G|R|G|R|G|
|G|B|G|B|G|B|G|B|
|R|G|R|G|R|G|R|G|
|G|B|G|B|G|B|G|B|
|R|G|R|G|R|G|R|G|
|G|B|G|B|G|B|G|B|
|R|G|R|G|R|G|R|G|
|G|B|G|B|G|B|G|B|

☐ Long-time exposure pixels
▨ Short-time exposure pixels

IMAGE PROCESSING APPARATUS, IMAGE PROCESSING METHOD, AND ELECTRONIC APPARATUS TO DETECT AND CORRECT FALSE COLOR IN HIGH DYNAMIC RANGE IMAGING

CROSS REFERENCE TO RELATED APPLICATIONS

This application claims the benefit of Japanese Priority Patent Application JP2013-163782 filed Aug. 7, 2013, the entire contents of which are incorporated herein by reference.

BACKGROUND

The present disclosure relates to image processing apparatuses, image processing methods, and electronic apparatuses and, in particular, to an image processing apparatus, an image processing method, and an electronic apparatus capable of effectively suppressing generation of false colors.

Up until now, solid state image sensors, for example, CCDs (Charge Coupled Devices), CMOS (Complementary Metal Oxide Semiconductor) image sensors, and the like, have been used in digital still cameras, digital video cameras, and other electronic apparatuses equipped with an imaging function. A solid state image sensor accumulates electric charges generated by photoelectric conversion in accordance with amount of incident light; and outputs electrical signals corresponding to the accumulated electric charges.

An upper limit exists on amount of electric charges to be accumulated for a photoelectric conversion element. If the photoelectric conversion element receives light above a certain level, the amount of the accumulated electric charges would reach its saturation level. As a result, so-called "blown out highlights" would occur in a subject region having brightness above a certain level, that is, intensity level of the subject region is set to the saturation level. In order to prevent an occurrence of such a phenomenon, for example, processing to control sensitivity to optimum value, by controlling an electric charge accumulation period for the photoelectric conversion element and, by adjusting an exposure time in response to the changes in the light outside, is performed.

For example, to a bright subject, the exposure time is shortened by high shutter speed, and thus the electric charge accumulation period for the photoelectric conversion element is shortened, thereby allowing the electrical signal to be output before the amount of the accumulated electric charges reaches its saturation level. Such processing enables output of an image with fully-reproduced gradations corresponding to the subject.

However, in imaging a subject including bright areas and dark areas, if the shutter is operated at a high speed, since the exposure time may not be enough for the darker areas, S/N (Signal/Noise) ratio would be decreased, and image quality is decreased. Thus, in order to fully reproduce the luminance level of the bright areas and the dark areas in an imaged picture of the subject including the bright areas and the dark areas, processing to realize high S/N ratio by making the exposure time longer for the pixels with relatively small amount of incident light on the image sensor; and to avoid saturation in the pixels with higher amount of incident light, may be needed.

In response to this, for example, with the use of HDR (High Dynamic Range) merge, which is made by varying the exposure time for every image and merging to one image a plurality of images that have been successively imaged, it would be possible to reproduce wide dynamic range that was not able to be reproduced by normal imaging.

Furthermore, instead of successively imaging the plurality of images as in the above processing, there has also been developed HDR merge processing to obtain one HDR image (high dynamic range image) by varying the exposure time for every pixel so that one image is imaged by different exposure times at a predetermined spatial period; and merging long-time exposure pixels and short-time exposure pixels within the image.

For example, an imaging apparatus which takes images in an SVE (Spatially Varying Exposure) mode; the exposure mode which varies the exposure time for each light-receiving element, in several patterns for every light-receiving element, has been disclosed in Japanese Patent Application Laid-Open No. 2002-118789.

In addition, according to processing disclosed in Japanese Patent Application Laid-Open Nos. 2013-66145 and 2012-257193, at the time of processing to merge pixels of different exposure times and different sensitivities from each other, a gain multiplication by a value determined from a set exposure time ratio, a previously-calculated sensitivity ratio, or the like, would be applied to a pixel signal having the lower signal amount. The resulting value and a pixel signal having the higher signal amount would be combined at a certain composition ratio.

Besides, as a method of making corrections to false color signals in the merged signals, a technique that makes the color of the subject region nearer to an achromatic color has been suggested in Japanese Patent Application Laid-Open No. 2011-87269.

SUMMARY

However, for example, even with the technique disclosed in Japanese Patent Application Laid-Open No. 2011-87269, in cases where false colors have been generated in a part having a chromatic color, such a part may appear as if faded; and thus it might have been difficult to reproduce the original significant color signals.

In view of the above circumstances, it is desirable to make it possible to effectively suppress the generation of false colors.

According to an embodiment of the present disclosure, there is provided an image processing apparatus including a false color intensity detection unit, merge processing unit, and a false color correction processing unit. The false color intensity detection unit is configured to detect a part estimated to have a high degree of generation of false color for predetermined parts of an input image imaged by different exposure times at a predetermined spatial period, and to calculate a false color intensity value indicating an estimated degree of generation of false color for each of the predetermined parts. The merge processing unit is configured to generate a high dynamic range image by executing processing to merge long-time exposure pixels and short-time exposure pixels making up the input image. The false color correction processing unit is configured to execute false color correction processing according to the intensity of the false color intensity value, to the high dynamic range image.

According to another embodiment of the present disclosure, there is provided an image processing method including detecting a part estimated to have a high degree of generation of false color for predetermined parts of an input image imaged by different exposure times at a predetermined spatial period, and calculating a false color intensity value indicating an estimated degree of generation of false color for each of the predetermined parts; generating a high dynamic range image by executing processing to merge long-time exposure pixels and short-time exposure pixels making up the input image; and executing false color correction processing according to the intensity of the false color intensity value, to the high dynamic range image.

According to still another embodiment of the present disclosure, there is provided an electronic apparatus including a false color intensity detection unit, merge processing unit, and a false color correction processing unit. The false color intensity detection unit is configured to detect a part estimated to have a high degree of generation of false color for predetermined parts of an input image imaged by different exposure times at a predetermined spatial period, and to calculate a false color intensity value indicating an estimated degree of generation of false color for each of the predetermined parts. The merge processing unit is configured to generate a high dynamic range image by executing processing to merge long-time exposure pixels and short-time exposure pixels making up the input image. The false color correction processing unit is configured to execute false color correction processing according to the intensity of the false color intensity value, to the high dynamic range image.

According to an embodiment of the present disclosure, it is possible to effectively suppress the generation of false colors.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 2A and 2B are figures showing an example of an input image to be input to an image processing unit;

DETAILED DESCRIPTION OF EMBODIMENTS

Hereinafter, a concrete example of an embodiment to which the present disclosure is applied will be described in detail with reference to the drawings.

Figure 1:
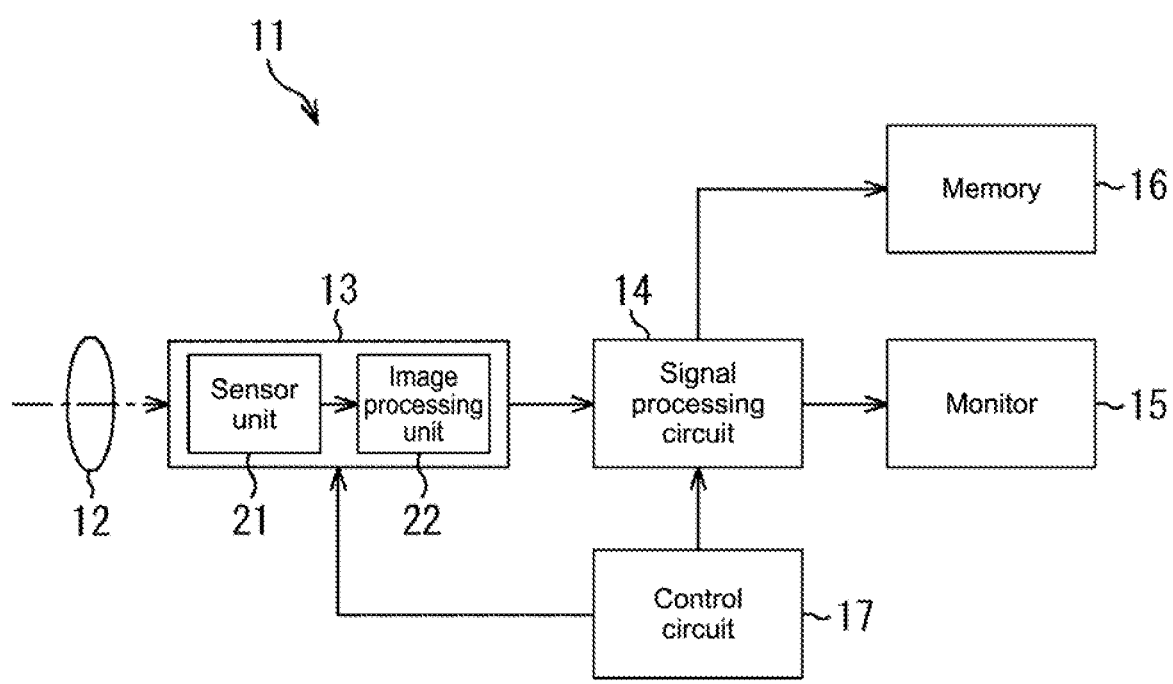
FIG. 1 is a block diagram showing a configuration example of an embodiment of an imaging apparatus to which the present disclosure is applied.

FIG. 1 is a block diagram showing a configuration example of an embodiment of an imaging apparatus (electronic apparatus) to which the present disclosure is applied.

As shown in FIG. 1, an imaging apparatus 11 includes an optical system 12, a solid state image sensor 13, a signal processing circuit 14, a monitor 15, a memory 16 and a control circuit 17. The imaging apparatus 11 is capable of imaging still images and moving images.

The optical system 12 is provided with one lens or a plurality of lenses; and is configured to guide image light (incident light) from a subject to the solid state image sensor 13, to form an image on a light receiving surface of a sensor unit 21 that the solid state image sensor 13 includes.

The solid state image sensor 13 includes the sensor unit 21 and an image processing unit 22. For example, a laminated structure in which a substrate forming the sensor unit 21 and a substrate forming the image processing unit 22 are laminated may be employed.

The sensor unit 21 includes a light receiving surface having a plurality of pixels arranged in an array. The sensor unit 21 outputs pixel signals corresponding to electric charges generated from photoelectric conversion in each pixel of the light receiving surface. On the light receiving surface of the sensor unit 21, a color filter for allowing the pixels to receive light in predetermined colors may be laminated. For example, a color filter in which red, blue, and green filters are arranged in a so-called Bayer arrangement may be laminated. Note that the image made by the image signals output from the sensor unit 21, that is, the image (hereinafter may be referred to as "input image") to be input from the sensor unit 21 to the image processing unit 22, will be described later with reference to FIGS. 2A and 2B.

The image processing unit 22 is configured to subject the input image input from the sensor unit 21 to image processing; and output an output image to the signal processing circuit 14, the output image being obtained as a result of the image processing. Note that a configuration of the image processing unit 22 will be described later with reference to FIGS. 3 to 6.

The signal processing circuit 14 is configured to subject the output image output from the image processing unit 22 to signal processing as performed in typical imaging apparatuses, for example, white balance adjustment, gamma correction, and the like; and provide the processed image to the monitor 15 and the memory 16.

The monitor 15 includes an LCD (Liquid Crystal Display) or organic EL (Electro Luminescence) panel, or the like. The monitor 15 displays the image provided from the signal processing circuit 14.

The memory 16 may be made of flash memory (for example, EEPROM (Electronically Erasable and Programmable Read Only Memory)) and the like, which may be built-in in the imaging apparatus 11, or may be detachable and attachable to the imaging apparatus 11. The memory 16 stores the image provided from the signal processing circuit 14.

The control circuit 17 is configured to control various processing, by outputting control signals to each of the blocks included in the imaging apparatus 11, according to, for example, a program stored in a memory (not shown).

FIGS. 2A and 2B show an example of an input image to be input to the image processing unit 22.

As shown in FIGS. 2A and 2B, an input image having red (R), blue (B), and green (G) pixels arranged in Bayer arrangement would be input from the sensor unit 21 to the image processing unit 22. Further, the input image is imaged with exposure times varied with a predetermined spatial period. In FIGS. 2A and 2B, hatched pixels indicate short-time exposure pixels (pixels for which the exposure time is short) and white pixels indicate long-time exposure pixels (pixels for which the exposure time is long).

FIG. 2A shows an input image imaged by an exposure time control method which controls the exposure time in such a manner that two lines of long-time exposure pixels and two lines of short-time exposure pixels are alternately arranged in an exposure array (hereinafter, this method may be referred to as "line method"). FIG. 2B shows an input image imaged by an exposure time control method which controls the exposure time in such a manner that the exposure times for each color become spatially uniform in an exposure array (hereinafter, this method may be referred to as "uniformity method").

For example, the image processing unit 22 in FIG. 1 may be capable of executing image processing to both of the input image imaged by the line method (FIG. 2A) and the input image imaged by the uniformity method (FIG. 2B). Further, although details of contents of the processing to be executed by the image processing unit 22 may differ by these input images, the order of processing in FIG. 1 may be the same.

Note that as the input image to be input to the image processing unit 22, it is also possible to use, for example, the images imaged by various exposure time control methods as those disclosed in above-mentioned Japanese Patent Application Laid-Open No. 2012-257193, as well as the input images shown in FIGS. 2A and 2B.

Figure 3:
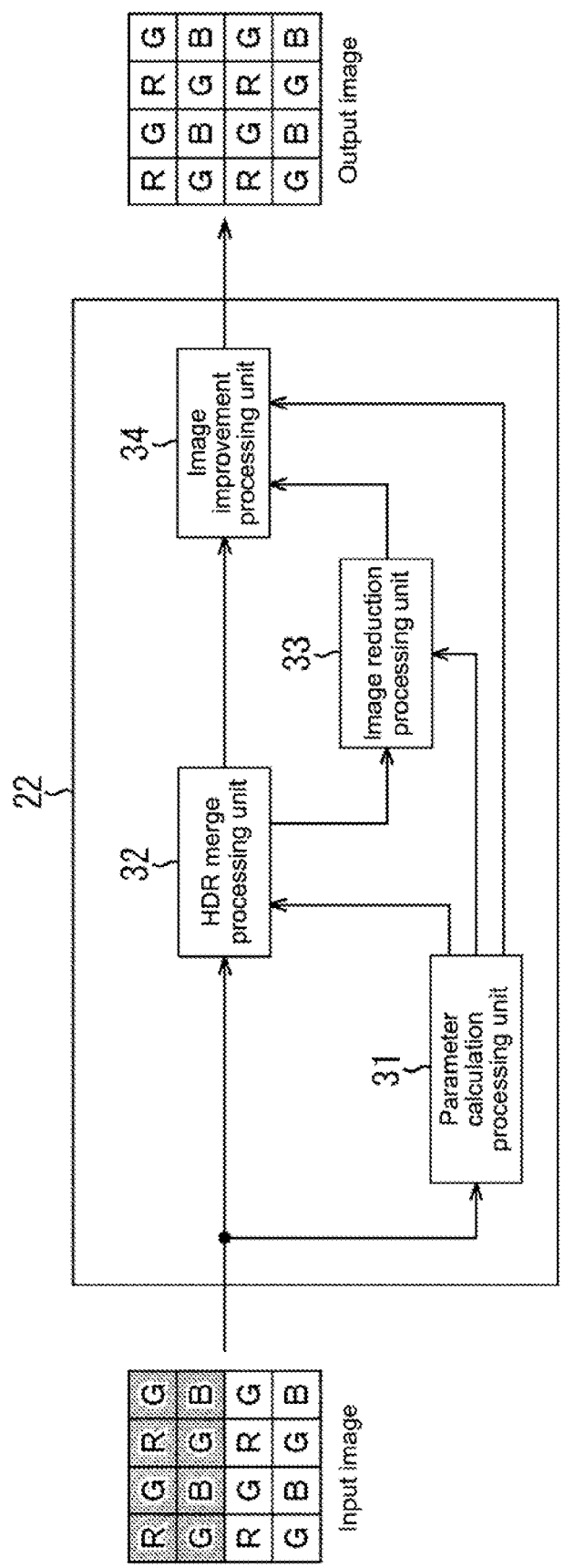
FIG. 3 is a block diagram showing a configuration example of the image processing unit.

FIG. 3 is a block diagram showing a configuration example of the image processing unit 22 of FIG. 1.

In FIG. 3, the image processing unit 22 is provided with a parameter calculation processing unit 31, an HDR merge processing unit 32, an image reduction processing unit 33 and an image improvement processing unit 34; and is configured to subject the input image as shown in FIGS. 2A and 2B to image processing; and output an output image obtained as a result of the image processing.

The parameter calculation processing unit 31 is configured to execute parameter calculation processing to calculate various parameters from the input image having been input to the image processing unit 22, which parameters are to be used in processing to be executed by the HDR merge processing unit 32, the image reduction processing unit 33, and the image improvement processing unit 34. For example, the parameter calculation processing unit 31 calculates a false color intensity value indicating an estimated degree of generation of false color, and provides the false color intensity value to the image reduction processing unit 33 and the image improvement processing unit 34. The parameter calculation processing unit 31 may calculate a composition ratio to be used for merging the long-time exposure pixels and the short-time exposure pixels, and provide the composition ratio to the HDR merge processing unit 32. Further, the parameter calculation processing unit 31 may calculate a noise estimate for estimating a noise generated in the HDR image obtained by merging the long-time exposure pixels and the short-time exposure pixels by the calculated composition ratio, and provide the noise estimate to the image improvement processing unit 34. Note that details of the configuration of the parameter calculation processing unit 31 will be described later with reference to FIG. 4.

The HDR merge processing unit 32 is configured to execute HDR merge processing to obtain one HDR image from the input image input to the image processing unit 22, that is, one image imaged with exposure times varied with the spatial period. Then, the HDR merge processing unit 32 provides the obtained HDR image to the image reduction processing unit 33 and the image improvement processing unit 34.

For example, the HDR merge processing unit 32 calculates merged pixel signal values which make up the HDR image, by executing merge processing to merge the long-time exposure pixels and the short-time exposure pixels according to the calculated composition ratio provided by the parameter calculation processing unit 31. Specifically, for a dark image region in the input image, the HDR merge processing unit 32 may use the long-time exposure pixels; and for a bright region which may cause blown out highlights, the HDR merge processing unit 32 may use the short-time exposure pixels to make the merge processing. At this time, the HDR merge processing unit 32 may multiply the short-time exposure pixels by a gain value determined from a set exposure time ratio, a previously-calculated sensitivity ratio, or the like; and perform mixing processing of the long-time exposure pixels and the short-time exposure pixels after multiplication, to output the HDR image in a form of Bayer arrangement.

The image reduction processing unit 33 is configured to refer to the false color intensity value calculated by the parameter calculation processing unit 31; execute image reduction processing to reduce the size of the HDR image provided from the HDR merge processing unit 32; and provide the reduced image to the image improvement processing unit 34, the reduced image resulting from the reduction of the HDR image. Note that details of the configuration of the image reduction processing unit 33 will be described later with reference to FIG. 5.

The image improvement processing unit 34 is configured to refer to the reduced image provided from the image reduction processing unit 33 corresponding to the HDR image provided from the HDR merge processing unit 32; and execute noise reduction processing to reduce noises in the HDR image and false color correction processing to make corrections to false colors in the HDR image, to improve image quality of the HDR image. Then, the output image (high-bit HDR image) after undergoing the above processes by the image improvement processing unit 34 may be subjected to, for example, gradation conversion processing by a gradation conversion processing unit (not shown), to reduce the number of bits of the pixel values of the image. After that, the resulting image is output to the signal processing circuit 14 of FIG. 1. Note that details of the configuration of the image improvement processing unit 34 will be described later with reference to FIG. 6.

Thus, the image processing unit 22 is capable of subjecting the input image to image processing, the input image being imaged with exposure times varied with a predetermined spatial period; to suppress the generation of noises in a low frequency zone, and, to output the output image with the generation of false color signals being suppressed.

Figure 4:
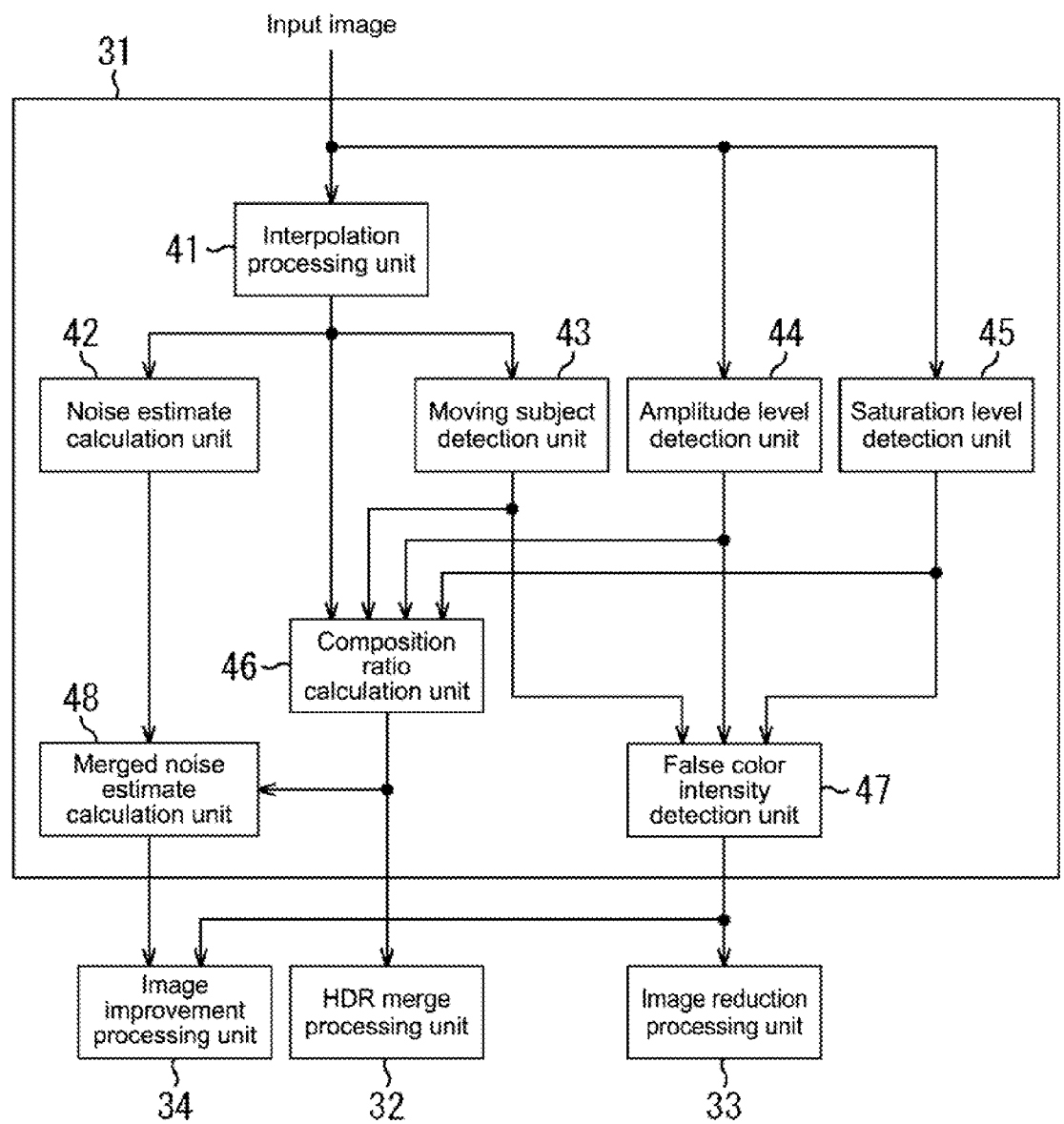
FIG. 4 is a block diagram showing a configuration example of a parameter calculation processing unit.

Next, FIG. 4 is a block diagram showing a configuration example of the parameter calculation processing unit 31 included in the image processing unit 22 of FIG. 1.

As shown in FIG. 4, the parameter calculation processing unit 31 is provided with an interpolation processing unit 41, a noise estimate calculation unit 42, a moving subject detection unit 43, an amplitude level detection unit 44, a saturation level detection unit 45, a composition ratio calculation unit 46, a false color intensity detection unit 47 and a merged noise estimate calculation unit 48. The input image (see FIGS. 2A and 2B) input to the image processing unit 22 would be provided to the interpolation processing unit 41, the amplitude level detection unit 44, and the saturation level detection unit 45.

The interpolation processing unit 41 is configured to execute interpolation processing to interpolate pixel values of red, green and blue for all of the pixel positions in the input image input to the image processing unit 22; and interpolate pixel values of the long-time exposure pixels and the short-time exposure pixels. For example, the interpolation processing unit 41 interpolates pixel values of green and blue for the pixel positions of the red pixels, with the use of each of the pixel values of the green and blue pixels located in the periphery of the corresponding red pixel.

The interpolation processing unit 41 interpolates pixel values for the pixel positions of the green pixels and for the blue pixels as well in the same manner. Furthermore, the interpolation processing unit 41 interpolates pixel values of short-time exposure pixels for the pixel positions of the long-time exposure pixels, with the use of each pixel value of the short-time exposure pixel located in the periphery of the corresponding long-time exposure pixel. The interpolation processing unit 41 interpolates pixel values for the pixel positions of the short-time exposure pixels as well in the same manner. Then, the interpolation processing unit 41 provides the resulting image to the noise estimate calculation unit 42, the moving subject detection unit 43, and the composition ratio calculation unit 46; the image being obtained by the interpolation processing of the input image, that is, the image having the pixel values of the long-time exposure pixels and the short-time exposure pixels of every color of red, green, and blue for all of the pixel positions in the image.

The noise estimate calculation unit 42 is configured to calculate a noise estimate for estimating a noise generated in the image, from all the components that make up the image provided from the interpolation processing unit 41, for each color making up the image.

For example, the noise estimate calculation unit 42 calculates, as the noise estimate, a value obtained by multiplying a square root of a signal value by a predetermined constant.

The moving subject detection unit 43 is configured to detect a moving subject imaged on the image provided from the interpolation processing unit 41; and output a moving subject detection value which indicates an extent of a moving subject. For example, the moving subject detection unit 43 may calculate, as the moving subject detection value, a value obtained by modulating a difference between the value of the long-time exposure pixels and the value of the short-time exposure pixels being multiplied by the gain value. Note that some examples of the processing for detecting the moving subject have been disclosed by the applicants in the previously filed applications of Japanese Patent Application Laid-Open Nos. 2012-186593 and 2012-235332, and the above-mentioned Japanese Patent Application Laid-Open No. 2011-87269, the entire contents of each which are incorporated herein by reference.

The amplitude level detection unit 44 is configured to detect an AC (alternating-current) component contained in the input image input to the image processing unit 22; and output an amplitude level detection value. For example, the amplitude level detection unit 44 may determine a value obtained by modulating a differential signal of maximum and minimum values for a local two-dimensional region, as the amplitude level detection value for that local two-dimensional region.

The saturation level detection unit 45 is configured to detect saturation level in the local region of the input image input to the image processing unit 22; and output a saturation level detection value.

For example, the saturation level detection unit 45 may detect the number of pixels that have the signals with their signal values greater or equal to a signal value defined as a saturation value for the pixel values existing within the local two-dimensional region; and determine the value obtained by standardizing (normalizing) the number of such pixels with the number of all the pixels existing within the local two-dimensional region, as the saturation level detection value for that local region.

To the composition ratio calculation unit 46, the image after undergoing the interpolation processing by the interpolation processing unit 41 would be provided and, the moving subject detection value from the moving subject detection unit 43, the amplitude level detection value from the amplitude level detection unit 44, and the saturation level detection value from the saturation level detection unit 45 would be provided as well. Then, the composition ratio calculation unit 46 refers to the moving subject detection value, the amplitude level detection value, the saturation level detection value, the pixel value of the long-time exposure pixels and the pixel value of the short-time exposure pixels; and calculates optimum composition ratio to use for merging the long-time exposure pixels and the short-time exposure pixels, from the image after undergoing the interpolation processing by the interpolation processing unit 41. Note that some examples of the processing for calculating the optimum composition ratio have been disclosed by the applicants in the previously filed applications of Japanese Patent Application Laid-Open Nos. 2012-186593 and 2012-235332.

To the false color intensity detection unit 47, the moving subject detection value from the moving subject detection unit 43, the amplitude level detection value from the amplitude level detection unit 44, and the saturation level detection value from the saturation level detection unit 45 would be provided. Then, the false color intensity detection unit 47 refers to the moving subject detection value, the amplitude level detection value, and the saturation level detection value; and detects a part estimated to have a high degree of generation of false color (generate strong false colors) and calculate a false color intensity value indicating an estimated degree (intensity) of generation of false color. For example, the false color intensity detection unit 47 detects a part having high signal values for both of the moving subject detection value and the saturation level detection value, as the part estimated to have a high degree of generation of false color due to a moving subject. Further, for example, the false color intensity detection unit 47 detects a part having high signal values for both of the amplitude level detection value and the saturation level detection value, as the part estimated to have a high degree of generation of false color due to the presence of an edge.

To the merged noise estimate calculation unit 48, the noise estimate would be provided from the noise estimate calculation unit 42 and the composition ratio would be provided from the composition ratio calculation unit 46. Then, the merged noise estimate calculation unit 48 uses the noise estimate and the composition ratio (for example, by merging noise estimate values at the composition ratio), and calculates a noise estimate (hereinafter may be referred to as a "merged noise estimate") for estimating a noise generated in the HDR image merged by the HDR image merge processing unit 32, for pixels of each color of red, green and blue.

The parameter calculation processing unit 31 is thus configured. The composition ratio calculated by the composition ratio calculation unit 46 would be provided to the HDR merge processing unit 32. The false color intensity value calculated by the false color intensity detection unit 47 would be provided to the image reduction processing unit 33 and the image improvement processing unit 34. The merged noise estimate calculated by the merged noise estimate calculation unit 48 would be provided to the image improvement processing unit 34.

Figure 5:
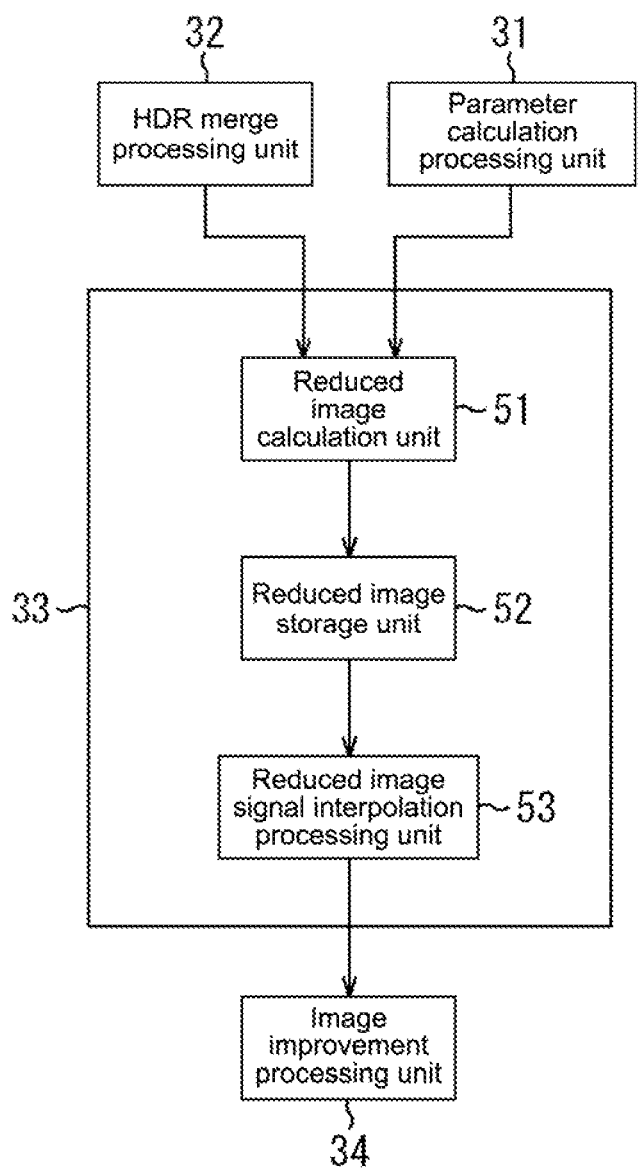
FIG. 5 is a block diagram showing a configuration example of an image reduction processing unit.

Next, FIG. 5 is a block diagram showing a configuration example of the image reduction processing unit 33 included in the image processing unit 22 of FIG. 1.

As shown in FIG. 5, the image reduction processing unit 33 is provided with a reduced image calculation unit 51, a reduced image storage unit 52, and a reduced image signal interpolation processing unit 53.

To the reduced image calculation unit 51, the merged pixel signal values, which are signal values of the image after undergoing the HDR merge processing by the HDR merge processing unit 32, would be provided and, the false color intensity value calculated by the false color intensity detection unit 47 of the parameter calculation processing unit 31 would be provided as well. Then, the reduced image calculation unit 51 calculates a reduced image by executing average processing for the merged pixel signal values, within a certain area. In this processing, the reduced image calculation unit 51 assumes that signal values of the merged pixels in a part having a high false color intensity value has a color signal that is largely deviated from its original significant color. Hence, the reduced image calculation unit 51 calculates the reduced image by excluding the signal values of the merged pixels in the part having the high false color intensity value. Thus, the reduced image calculation unit 51 is able to calculate the reduced image with high reliability in general color information.

The reduced image storage unit 52 is configured to store the reduced image calculated by the reduced image calculation unit 51.

The reduced image signal interpolation processing unit 53 is configured to read out the reduced image of one frame before, which reduced image has been stored in the reduced image storage unit 52; and execute interpolation processing in such a manner that when the pixels making up the reduced image are to be used in the subsequent processing (for example, similarity determination processing by a similarity determination unit 61, noise reduction processing by the image improvement processing unit 34, and false color correction processing by a false color correction processing unit 63), the pixels are invariably at the same distance from a pixel of interest. By using the reduced image after undergoing such interpolation processing, it is possible to reduce Mach bands appearing on a gradation part or the like.

The image reduction processing unit 33 is thus configured. The reduced image after undergoing the interpolation processing by the reduced image signal interpolation processing unit 53 (hereinafter, this image may be referred to as an "interpolated reduced image") would be provided to the image improvement processing unit 34 of FIG. 3. However, note that the reduced image before the interpolation processing by the reduced image signal interpolation processing unit 53 may be used in the subsequent processing as well.

Figure 6:
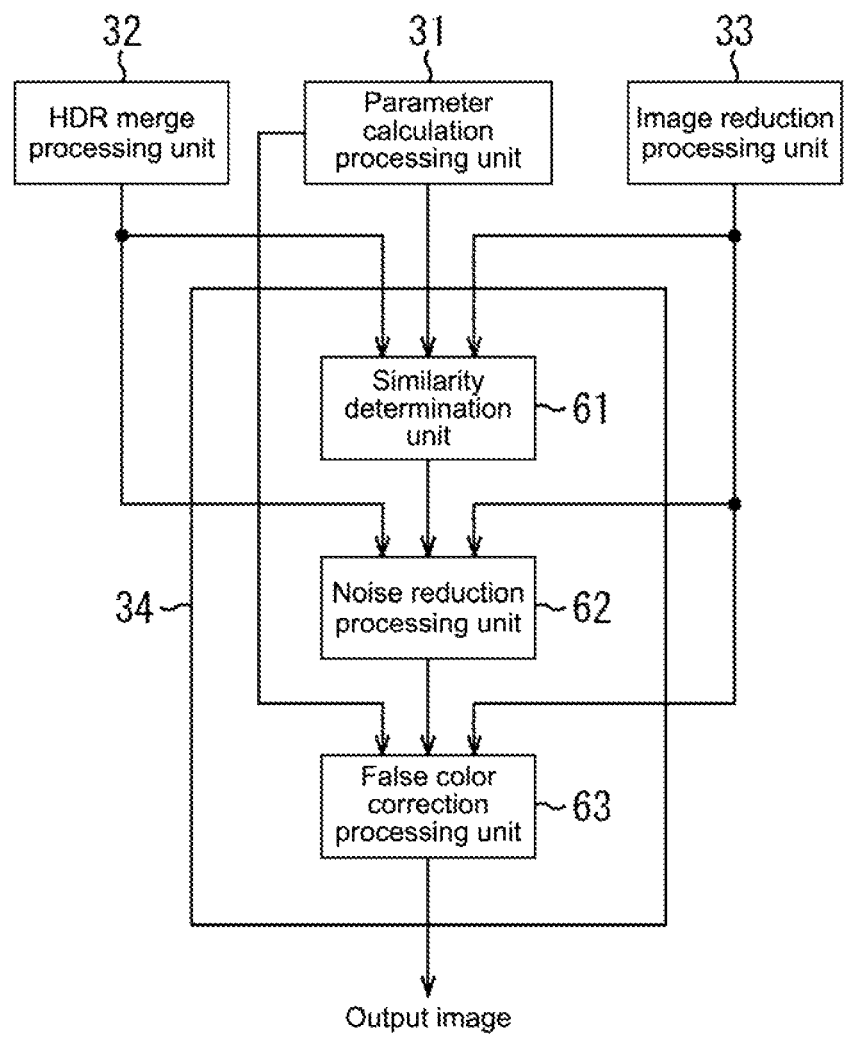
FIG. 6 is a block diagram showing a configuration example of an image improvement processing unit.

Next, FIG. 6 is a block diagram showing a configuration example of the image improvement processing unit 34 included in the image processing unit 22 of FIG. 3.

As shown in FIG. 6, the image reduction processing unit 33 is provided with a similarity determination unit 61, a noise reduction processing unit 62, and a false color correction processing unit 63.

The similarity determination unit 61 is configured to calculate a similarity determination value with the use of: the merged pixel signal values making up the HDR image obtained by the HDR merge processing unit 32; the merged noise estimate calculated by the merged noise estimate calculation unit 48; and the interpolated reduced image calculated by the reduced image signal interpolation processing unit 53. For example, the similarity determination unit 61 may use the merged noise estimate as a reference and calculate the differential value between the merged pixel signal values making up the HDR image and the pixel signal values of the interpolated reduced image as the similarity determination value.

The noise reduction processing unit 62 is configured to execute noise reduction processing in which the merged pixel signal values and the interpolated reduced image are mixed according to the intensity (magnitude) of the similarity determination value obtained by the similarity determination unit 61, the merged pixel signal values making up the HDR image obtained by the HDR merge processing unit 32, the interpolated reduced image being calculated by the reduced image signal interpolation processing unit 53.

The false color correction processing unit 63 is configured to execute false color correction processing according to the intensity of the false color intensity value calculated by the false color intensity detection unit 47, to make the signal values, of the HDR image after undergoing the noise reduction processing by the noise reduction processing unit 62, closer to the color composition ratios of the corresponding region in the interpolated reduced image calculated by the reduced image signal interpolation processing unit 53.

The image improvement processing unit 34 is thus configured. The HDR image after undergoing the false color correction processing by the false color correction processing unit 63 would be output, as an output image, to the signal processing unit 14 as a subsequent stage.

Here, since the HDR merge processing unit 32 performs mixing processing of the long-time exposure pixels and the short-time exposure pixels after multiplying the short-time exposure pixels by the gain value, as described above, noise levels can be relatively high in the parts where many short-time exposure pixels are used. Accordingly, the long-time exposure pixels and the short-time exposure pixels have different noise characteristics from each other. Therefore, in the past, it has been necessary to provide independent logic circuits to long-time exposure pixels and short-time exposure pixels when subjecting an HDR image to noise reduction processing.

In addition, usually, in order to remove low-frequency noises, smoothing processing using a region of a wide range may be needed, and therefore relatively large storage area and logic circuit may be needed. Thus in cases where long-time exposure pixels and short-time exposure pixels are subjected independently to their respective noise reduction processing operations, there may be a need of providing the large storage area and logic circuit for two images.

In contrast, the image processing unit 22 is configured to subject the HDR image to the noise reduction processing, for the HDR image obtained by performing the mixing processing of the long-time exposure pixels and the short-time exposure pixels. Accordingly, for the image processing unit 22, the storage area and the logic circuit for one image may be enough.

Besides, as described above, the composition rate of the long-time exposure pixels and the short-time exposure pixels may not be uniform within the plane of the input image, but may need to be adaptively varied. Hence, in order to accurately calculate the noise estimate in the merged pixel signal values making up the HDR image obtained by performing the mixing processing of the long-time exposure pixels and the short-time exposure pixels, noise estimate values may need to be calculated independently from the long-time exposure pixels and the short-time exposure pixels, and these noise estimate values may need to be merged in the same manner as in the calculation of the merged pixel signal values, so that the noise estimate in the merged pixel signal values would be calculated. Accordingly, in calculating the noise estimate in the merged pixel signal values, it may be necessary to know the composition ratio for the calculation. However, since this composition ratio has not been output to the subsequent stage of the solid state image sensor, it has been difficult to accurately calculate the noise estimate and execute noise reduction processing by a processing system disposed at the subsequent stage of the solid state image sensor. Thus, in order to accurately calculate the noise estimate and remove low-frequency noises while preventing an increase in the scale of the storage area and the logic circuit, it may be necessary to grasp the composition ratio of the long-time exposure pixels and the short-time exposure pixels, which composition ratio can usually be recognized only by the information processing unit within the solid state image sensor.

In contrast, since the merged noise estimate calculation unit 48 is capable of calculating the merged noise estimate by using the composition ratio calculated by the composition ratio calculation unit 46, the image processing unit 22 is capable of accurately estimating the noise generated in the HDR image. Thus, it is possible to effectively reduce the noise by noise reduction processing unit 62.

Further, in the image processing unit 22, a method of storing, to the reduced image storage unit 52, a reduced image of the HDR image merged by the HDR merge processing unit 32 in the previous frame is employed as a method of compressing the storage area.

Figure 7A:
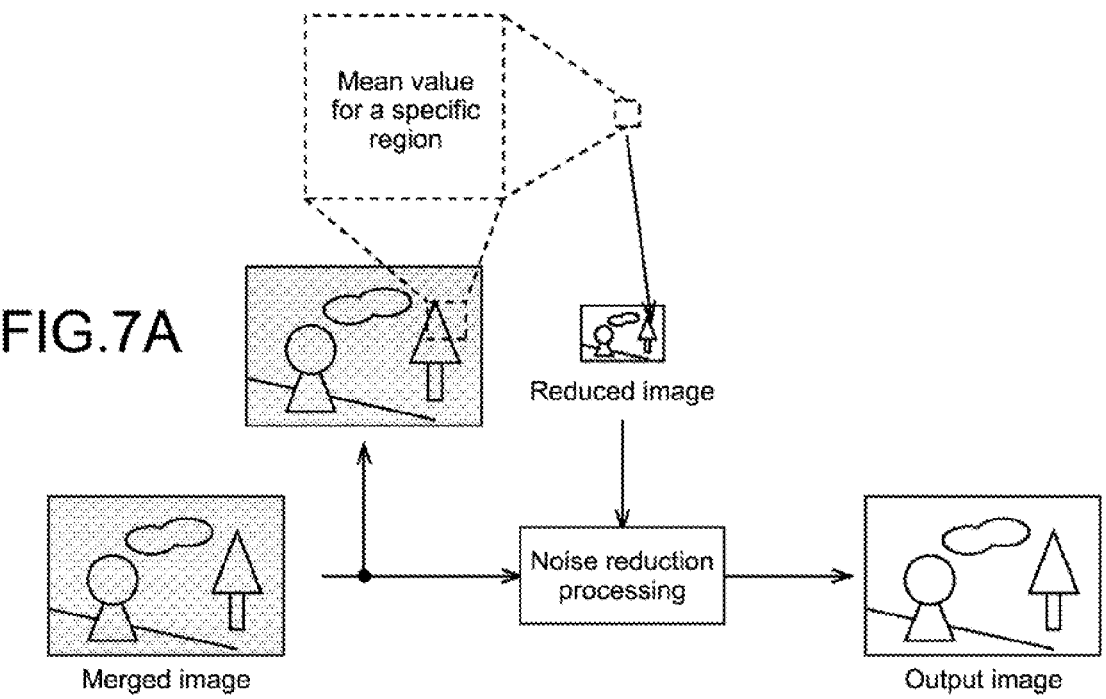
FIGS. 7A and 7B are figures for describing a method of compressing a storage area and processing of interpolation to a reduced image.

That is, as shown in FIG. 7A, in the image processing unit 22, the reduced image calculation unit 51 calculates the reduced image of the HDR image merged by the HDR merge processing unit 32, by using a mean value for a specific region of the HDR image. Then, the noise reduction processing unit 62 refers to the reduced image of the HDR image and to the HDR image itself; and executes noise reduction processing, to output the resulting output image.

For example, in the past, a large storage area has been necessary in order to refer to the reduced image of the HDR image and to the HDR image itself at the same time in the same plane. In contrast to this, in the image processing unit 22, by storing the reduced image of the HDR image calculated by the HDR merge processing unit 32 in the previous frame to the reduced image storage unit 52, it is possible to largely compress the capacity of the storage area as compared to the case of the past.

Figure 7B:
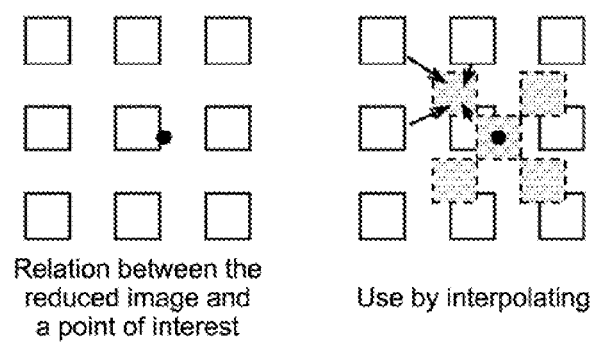

In addition, as shown in FIG. 7B, in the image processing unit 22, the reduced image signal interpolation processing unit 53 executes the interpolation processing to interpolate to the reduced image in such a manner that the reduced image is invariably at the same distance from a pixel of interest. In the left part of FIG. 7B, there is shown a positional relation between the reduced image (white squares in the figure) and a pixel of interest (black dot in the figure). In the right part of FIG. 7B, the pixels of the reduced image that have been interpolated by the reduced image signal interpolation processing unit 53 are indicated by hatched squares.

Further, by the similarity determination unit 61 executing the similarity determination processing with the use of the reduced image after undergoing the interpolation processing, it is possible to suppress the appearance of Mach bands on a gradation part. That is, in cases where the signals of the reduced image are used directly, a phenomenon of band-like Mach bands may appear in a gradation part or the like, in which part the signal strength is gradually increased along a certain direction; and the image processing unit 22 may suppress the appearance of this phenomenon.

Furthermore, the reduced image after undergoing the interpolation processing by the reduced image signal interpolation processing unit 53 may be used also for the purpose of knowing general color information. As a result, in the image processing unit 22, by calculating signal strengths of a region which is likely to have a false color, and by the false color correction processing unit 63 making the signal strengths of the HDR image closer to the color composition ratios of the corresponding region in the reduced image, according to the intensity of false color detection signal, it is possible to reproduce the original significant color signals.

Figure 8:
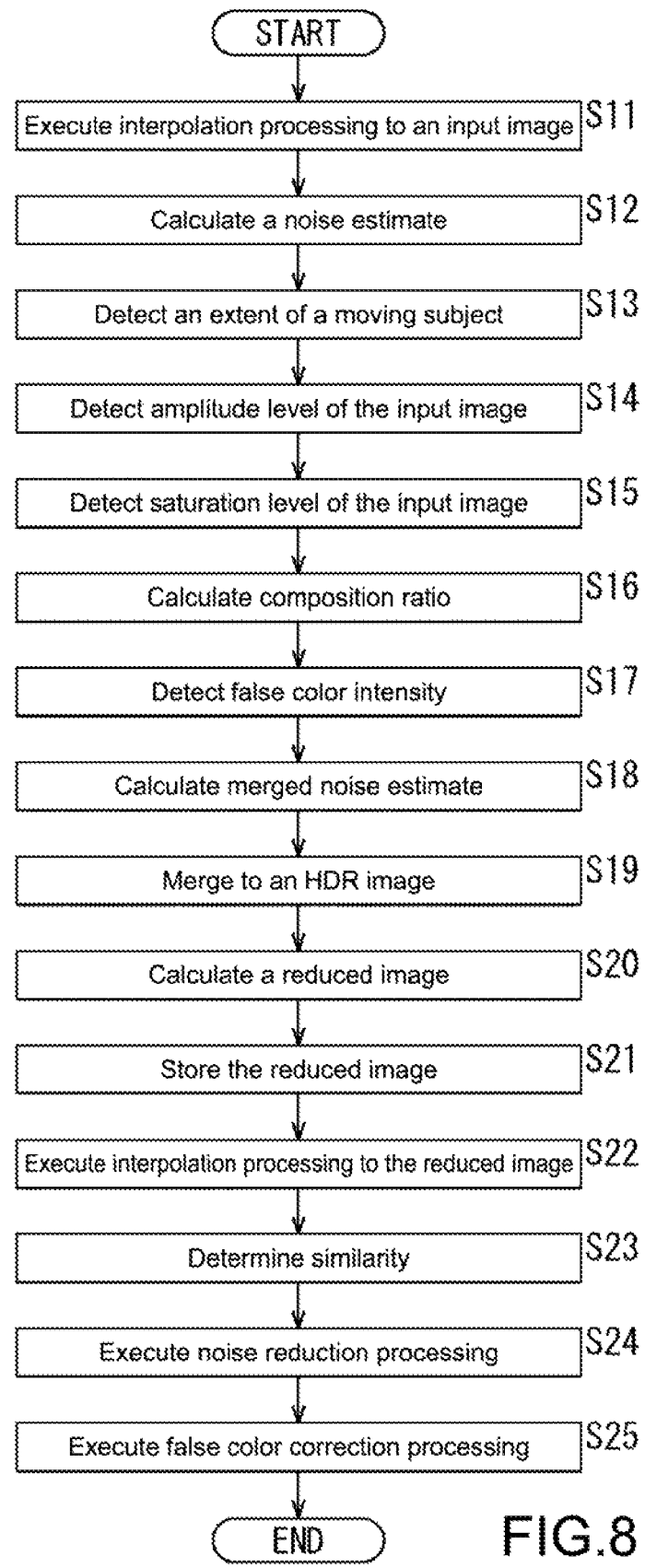
FIG. 8 is a flowchart for describing image processing.

Next, FIG. 8 is a flowchart for describing image processing executed by the image processing unit 22 of FIG. 3.

The processing is started, for example, when the sensor unit 21 of FIG. 1 starts to provide the input image to the image processing unit 22. In step S11, the interpolation processing unit 41 executes interpolation processing to interpolate each color of the input image; and interpolate the long-time exposure pixels and the short-time exposure pixels of the input image. The interpolation processing unit 41 provides the input image after undergoing the interpolation processing, to the noise estimate calculation unit 42, the moving subject detection unit 43, and the composition ratio calculation unit 46.

In step S12, the noise estimate calculation unit 42 calculates the noise estimate for estimating the noise generated in the image after undergoing the interpolation processing of step S11 by the interpolation processing unit 41. The noise estimate calculation unit 42 provides the calculated noise estimate to the merged noise estimate calculation unit 48.

In step S13, the moving subject detection unit 43 detects the moving subject imaged on the image after undergoing the interpolation processing of step S11 by the interpolation processing unit 41. Then, the moving subject detection unit 43 calculates the moving subject detection value indicating the extent of the moving subject; and provides the calculated value to the composition ratio calculation unit 46 and the false color intensity detection unit 47.

In step S14, the amplitude level detection unit 44 detects the AC component contained in the input image input to the image processing unit 22, calculates the amplitude level detection value, and provides the calculated value to the composition ratio calculation unit 46 and the false color intensity detection unit 47.

In step S15, the saturation level detection unit 45 detects the saturation level in the local region of the input image input to the image processing unit 22, calculates the saturation level detection value, and provides the calculated value to the composition ratio calculation unit 46 and the false color intensity detection unit 47.

In step S16, the composition ratio calculation unit 46 refers to the moving subject detection value, the amplitude level detection value, and the saturation level detection value; and calculates the optimum composition ratio to use for merging the long-time exposure pixels and the short-time exposure pixels, from the image after undergoing the interpolation processing of step S11 by the interpolation processing unit 41.

In step S17, the false color intensity detection unit 47 refers to the moving subject detection value, the amplitude level detection value, and the saturation level detection value; and detects a part estimated to have a high degree of generation of false color. Then, the false color intensity detection unit 47 calculates the false color intensity value indicating the estimated degree of generation of false color; and provides the calculated value to the reduced image calculation unit 51 and the false color correction processing unit 63.

In step S18, the merged noise estimate calculation unit 48 uses the noise estimate calculated by the noise estimate calculation unit 42 in step S12 and the composition ratio calculated by the composition ratio calculation unit 46 in step S16, and calculates the merged noise estimate. Then, the merged noise estimate calculation unit 48 provides the calculated merged noise estimate to the similarity determination unit 61 and noise reduction processing unit 62.

In step S19, the HDR merge processing unit 32 executes HDR merge processing to the input image input to the image processing unit 22, according to the composition ratio calculated by the composition ratio calculation unit 46 in step S16, to obtain an HDR image.

Then, the HDR merge processing unit 32 provides the obtained HDR image to the reduced image calculation unit 51, similarity determination unit 61, and the noise reduction processing unit 62.

In step S20, the reduced image calculation unit 51 refers to the false color intensity value calculated by the false color intensity detection unit 47 in step S17 and reduces the HDR image that has been provided from the HDR merge processing unit 32 in step S19, to obtain the reduced image; and provides the obtained reduced image to the reduced image storage unit 52.

In step S21, the reduced image storage unit 52 stores the reduced image provided from the reduced image calculation unit 51 in step S20.

In step S22, the reduced image signal interpolation processing unit 53 executes interpolation processing in such a manner that when the pixels making up the reduced image of one frame before that has been stored in the reduced image storage unit 52 are to be used in the subsequent processing, the pixels are invariably at the same distance from a pixel of interest. The reduced image signal interpolation processing unit 53 thus obtains the interpolated reduced image.

In step S23, the similarity determination unit 61 calculates the similarity determination value with the use of: the merged pixel signal values making up the HDR image provided from the HDR merge processing unit 32 in step S19; the merged noise estimate provided from the merged noise estimate calculation unit 48 in step S18; and the interpolated reduced image provided from the reduced image signal interpolation processing unit 53 in step S22.

In step S24, the noise reduction processing unit 62 executes noise reduction processing in which the merged pixel signal values and the interpolated reduced image are mixed according to the intensity of the similarity determination value provided from the similarity determination unit 61 in step S23, the merged pixel signal values making up the HDR image being provided from the HDR merge processing unit 32 in step S19, the interpolated reduced image being provided from the reduced image signal interpolation processing unit 53 in step S22.

In step S25, the false color correction processing unit 63 executes false color correction processing according to the intensity of the false color intensity value provided from by the false color intensity detection unit 47 in step S17, to make the signal values, of the HDR image after undergoing the noise reduction processing of step S24 by the noise reduction processing unit 62, closer to the color composition ratios of the corresponding region in the interpolated reduced image provided from the reduced image signal interpolation processing unit 53 in step S22. Then, the image obtained as a result of the false color correction processing by the false color correction processing unit 63 is output as the output image; and the processing is ended.

As described above, in the image processing unit 22, by calculating the noise estimate adaptively for all of the pixels in the merged signals, it is possible to accurately reduce the noise. Furthermore, it is possible to correct the false colors to the original significant colors, for the false colors generated in the merge processing.

Further, the image processing unit 22 is able to reduce the noise more effectively than in the case of the past, by making an estimation based on the merged noise estimate calculated with the use of the composition ratio. Usually, the composition ratio is decided according to various conditions, and the value may not be uniform among all the pixels within the plane. Hence it has been difficult to accurately calculate the noise estimate to use for executing noise reduction processing, by a processing system disposed at the subsequent stage of the solid state image sensor.

In contrast to this, since the image processing unit 22 is capable of estimating the noise generated in the HDR image more accurately by using the composition ratio used for merging the long-time exposure pixels and the short-time exposure pixels in the HDR merge processing unit 32, it is possible to reduce the noise more effectively than in the case of the past.

In addition, for example, in the past, in cases where the signals of the reduced image are used directly when the similarity determination processing is executed with the use of the image signal values being merged and the noise estimate values being merged, there has been a phenomenon of band-like Mach bands appearing in a gradation part or the like, in which part the signal strength is gradually increased along a certain direction.

In contrast to this, the image processing unit 22 is capable of reducing Mach bands appearing on a gradation part or the like, by using the interpolated reduced image, when the similarity determination unit 61 executes the similarity determination processing with the use of the merged pixel signal values making up the HDR image and the merged noise estimate; in which the interpolated reduced image has undergone the interpolation processing by the reduced image signal interpolation processing unit 53 to interpolate to the reduced image in such a manner that the reduced image is invariably at the same distance from a pixel of interest.

Moreover, in the image processing unit 22, by executing the false color correction processing to the color balance of the merged pixel signal values making up the HDR image, for a part having a high degree of false color signal, to make the color balance closer to the color composition ratios of the corresponding region in the interpolated reduced image, it is possible to correct the false colors to the original significant color balance.

Note that, in addition to the configuration as described above in which the reduced image of one frame before is used, for example, with a configuration which produces a smoothed image within the same frame, it becomes possible to further improve the accuracy in the noise reduction processing and the false color correction processing. Further, the target of the noise reduction processing by the image processing unit 22 has been all the noise components that exist in the low frequency zone, but it is also possible to reduce noises selectively by limiting the target of the noise reduction processing to luminance signals, specific color signals, color ratio signals, color difference signals, or the like. Moreover, even in cases where some miscorrection or omission of correction exists after various processing in a previous stage of the image processing unit 22, the image processing unit 22 may receive the location where the miscorrection or the omission of correction exists, with the same signal strength as that of the false signal or the like, so the influence by the miscorrection, the omission of correction, or the like, may be reduced.

Note that the present disclosure may be applied also to a mobile phone having an imaging function, or various electronic apparatuses including other apparatuses having an imaging function, as well as to the imaging apparatus 11 which may be, for example, a digital still camera, a digital video camera, or the like.

Furthermore, the present disclosure may employ, for example, the following configurations.

(1) An image processing apparatus, including:
a false color intensity detection unit configured
to detect a part estimated to have a high degree of generation of false color for predetermined parts of an input image imaged by different exposure times at a predetermined spatial period, and
to calculate a false color intensity value indicating an estimated degree of generation of false color for each of the predetermined parts;
a merge processing unit configured to generate a high dynamic range image by executing processing to merge long-time exposure pixels and short-time exposure pixels making up the input image; and
a false color correction processing unit configured to execute false color correction processing according to the intensity of the false color intensity value, to the high dynamic range image.

(2) The image processing apparatus according to (1), further including:
a moving subject detection unit configured to detect a moving subject imaged on the input image from the long-time exposure pixels and the short-time exposure pixels making up the input image, and output a moving subject detection value indicating an extent of a moving subject for each of the predetermined parts of the input image; and
a saturation level detection unit configured to detect saturation level in the input image, and output a saturation level detection value for each of the predetermined parts of the input image;
in which,
the false color correction processing unit is further configured to refer to the moving subject detection value and the saturation level detection value, to calculate the false color intensity value.

(3) The image processing apparatus according to (1), further including:
an amplitude level detection unit configured to detect an AC component contained in the input image, and output an amplitude level detection value for each of the predetermined parts of the input image; and
a saturation level detection unit configured to detect saturation level in the input image, and output a saturation level detection value for each of the predetermined parts of the input image;
in which,
the false color correction processing unit is further configured to refer to the amplitude level detection value and the saturation level detection value, to calculate the false color intensity value.

(4) The image processing apparatus according to (1), further including:
a moving subject detection unit configured to detect a moving subject imaged on the input image from the long-time exposure pixels and the short-time exposure pixels making up the input image, and output a moving subject detection value indicating an extent of a moving subject for each of the predetermined parts of the input image;
an amplitude level detection unit configured to detect an AC component contained in the input image, and output an amplitude level detection value for each of the predetermined parts of the input image; and
a saturation level detection unit configured to detect saturation level in the input image, and output a saturation level detection value for each of the predetermined parts of the input image;
in which,
the false color correction processing unit is further configured to refer to the moving subject detection value, the amplitude level detection value, and the saturation level detection value, to calculate the false color intensity value.

(5) The image processing apparatus according to (4), further including
a composition ratio calculation unit configured to
refer to
the moving subject detection value calculated by the moving subject detection unit,
the amplitude level detection value calculated by the amplitude level detection unit, and
saturation level detection value calculated by the saturation level detection unit, and
calculate a composition ratio to use in the processing of the merge processing unit to merge the long-time exposure pixels and the short-time exposure pixels making up the input image.

(6) The image processing apparatus according to (5), further including:
a noise estimate calculation unit configured to calculate, from all the components that make up the input image, a noise estimate for estimating a noise generated in the input image; and
a merged noise estimate calculation unit configured to calculate a merged noise estimate for estimating a noise generated in the high dynamic range image generated by the merge processing unit, by using the noise estimate calculated by the noise estimate calculation unit and the composition ratio calculated by the composition ratio calculation unit.

(7) The image processing apparatus according to any one of (1) to (6), further including:
a reduced image calculation unit configured to refer to the false color intensity value calculated by the false color correction processing unit, and calculate the reduced image of the high dynamic range image being reduced, excluding signal values of predetermined parts of which the false color intensity value is more than or equal to a predetermined value;
and a reduced image storage unit configured to store the reduced image.

(8) The image processing apparatus according to (7), further including
a reduced image signal interpolation processing unit configured to interpolate pixels that make up the reduced image stored in the reduced image storage unit, in such a manner that the pixels making up the reduced image are invariably at the same distance from a pixel of interest when used in subsequent processing.

(9) The image processing apparatus according to (8), further including:
a similarity determination unit configured to
execute similarity determination with the use of
pixel values making up the high dynamic range image,
the merged noise estimate calculated by the merged noise estimate calculation unit, and
the reduced image interpolated by the reduced image signal interpolation processing unit, and
calculate a similarity determination value; and
a noise reduction processing unit configured to execute noise reduction processing by mixing the high dynamic range image and reduced image interpolated by the reduced image signal interpolation processing unit, according to an intensity of the similarity determination value calculated by the similarity determination unit.

(10) The image processing apparatus according to (9), in which
the false color correction processing unit is configured to execute false color correction processing by making signal values, of the high dynamic range image after undergoing the noise reduction processing by the noise reduction processing unit, closer to color composition ratios of the corresponding region in the reduced image interpolated by the reduced image signal interpolation processing unit, according to the intensity of the false color intensity value.

(11) An image processing method, including:
detecting a part estimated to have a high degree of generation of false color for predetermined parts of an input image imaged by different exposure times at a predetermined spatial period, and calculating a false color intensity value indicating an estimated degree of generation of false color for each of the predetermined parts;
generating a high dynamic range image by executing processing to merge long-time exposure pixels and short-time exposure pixels making up the input image; and
executing false color correction processing according to the intensity of the false color intensity value, to the high dynamic range image.

(12) An electronic apparatus, including:
a false color intensity detection unit configured
to detect a part estimated to have a high degree of generation of false color for predetermined parts of an input image imaged by different exposure times at a predetermined spatial period, and
to calculate a false color intensity value indicating an estimated degree of generation of false color for each of the predetermined parts;
a merge processing unit configured to generate a high dynamic range image by executing processing to merge long-time exposure pixels and short-time exposure pixels making up the input image; and
a false color correction processing unit configured to execute false color correction processing according to the intensity of the false color intensity value, to the high dynamic range image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a false color intensity detection unit configured
to detect a part estimated to have a high degree of generation of false color for predetermined parts of an input image imaged by different exposure times at a predetermined spatial period, and
to calculate a false color intensity value indicating an estimated degree of generation of false color for each of the predetermined parts;
a merge processing unit configured to generate a high dynamic range image by executing processing to merge long-time exposure pixels and short-time exposure pixels making up the input image; and
a false color correction processing unit configured to execute false color correction processing according to an intensity of the false color intensity value to the high dynamic range image.

2. The image processing apparatus according to claim 1, further comprising:
a moving subject detection unit configured to detect a moving subject imaged on the input image from the long-time exposure pixels and the short-time exposure pixels making up the input image, and output a moving subject detection value indicating an extent of a moving subject for each of the predetermined parts of the input image; and
a saturation level detection unit configured to detect a saturation level in the input image, and output a saturation level detection value for each of the predetermined parts of the input image;
in which,
the false color correction processing unit is further configured to refer to the moving subject detection value and the saturation level detection value, to calculate the false color intensity value.

3. The image processing apparatus according to claim 1, further comprising:
an amplitude level detection unit configured to detect an AC component contained in the input image, and output an amplitude level detection value for each of the predetermined parts of the input image; and
a saturation level detection unit configured to detect a saturation level in the input image, and output a saturation level detection value for each of the predetermined parts of the input image;
in which,
the false color correction processing unit is further configured to refer to the amplitude level detection value and the saturation level detection value, to calculate the false color intensity value.

4. The image processing apparatus according to claim 1, further comprising:
a moving subject detection unit configured to detect a moving subject imaged on the input image from the long-time exposure pixels and the short-time exposure pixels making up the input image, and output a moving subject detection value indicating an extent of a moving subject for each of the predetermined parts of the input image;
an amplitude level detection unit configured to detect an AC component contained in the input image, and output an amplitude level detection value for each of the predetermined parts of the input image; and
a saturation level detection unit configured to detect a saturation level in the input image, and output a saturation level detection value for each of the predetermined parts of the input image;
in which,
the false color correction processing unit is further configured to refer to the moving subject detection value, the amplitude level detection value, and the saturation level detection value, to calculate the false color intensity value.

5. The image processing apparatus according to claim 4, further comprising
a composition ratio calculation unit configured to
refer to
the moving subject detection value calculated by the moving subject detection unit,
the amplitude level detection value calculated by the amplitude level detection unit, and
the saturation level detection value calculated by the saturation level detection unit, and
calculate a composition ratio to use in the processing of the merge processing unit to merge the long-time exposure pixels and the short-time exposure pixels making up the input image.

6. The image processing apparatus according to claim 5, further comprising:
a noise estimate calculation unit configured to calculate, from all the components that make up the input image, a noise estimate for estimating a noise generated in the input image; and
a merged noise estimate calculation unit configured to calculate a merged noise estimate for estimating a noise generated in the high dynamic range image generated by the merge processing unit, by using the noise estimate calculated by the noise estimate calculation unit and the composition ratio calculated by the composition ratio calculation unit.

7. The image processing apparatus according to claim 1, further comprising:
a reduced image calculation unit configured to refer to the false color intensity value calculated by the false color correction processing unit, and calculate a reduced image of the high dynamic range image being reduced, excluding signal values of predetermined parts of which the false color intensity value is more than or equal to a predetermined value;
and a reduced image storage unit configured to store the reduced image.

8. The image processing apparatus according to claim 7, further comprising
a reduced image signal interpolation processing unit configured to interpolate pixels that make up the reduced image stored in the reduced image storage unit, in such a manner that the pixels making up the reduced image are invariably at the same distance from a pixel of interest when used in subsequent processing.

9. The image processing apparatus according to claim 8, further comprising:
a similarity determination unit configured to
execute similarity determination with the use of
pixel values making up the high dynamic range image,
a merged noise estimate calculated by a merged noise estimate calculation unit, and
the reduced image interpolated by the reduced image signal interpolation processing unit, and
calculate a similarity determination value; and
a noise reduction processing unit configured to execute noise reduction processing by mixing the high dynamic range image and reduced image interpolated by the reduced image signal interpolation processing unit, according to an intensity of the similarity determination value calculated by the similarity determination unit.

10. The image processing apparatus according to claim 9, wherein
the false color correction processing unit is configured to execute false color correction processing by making signal values, of the high dynamic range image after undergoing the noise reduction processing by the noise reduction processing unit, closer to color composition ratios of a corresponding region in the reduced image interpolated by the reduced image signal interpolation processing unit, according to an intensity of the false color intensity value.

11. An image processing method, comprising:
detecting a part estimated to have a high degree of generation of false color for predetermined parts of an input image imaged by different exposure times at a predetermined spatial period, and calculating a false color intensity value indicating an estimated degree of generation of false color for each of the predetermined parts;
generating a high dynamic range image by executing processing to merge long-time exposure pixels and short-time exposure pixels making up the input image; and
executing false color correction processing according to an intensity of the false color intensity value to the high dynamic range image.

12. An electronic apparatus, comprising:
a false color intensity detection unit configured
to detect a part estimated to have a high degree of generation of false color for predetermined parts of an input image imaged by different exposure times at a predetermined spatial period, and
to calculate a false color intensity value indicating an estimated degree of generation of false color for each of the predetermined parts;
a merge processing unit configured to generate a high dynamic range image by executing processing to merge long-time exposure pixels and short-time exposure pixels making up the input image; and
a false color correction processing unit configured to execute false color correction processing according to an intensity of the false color intensity value, to the high dynamic range image.

* * * * *